US012053950B2

(12) United States Patent
Eder et al.

(10) Patent No.: US 12,053,950 B2
(45) Date of Patent: Aug. 6, 2024

(54) DEVICE AND METHOD FOR PROCESSING A MATERIAL WEB

(71) Applicant: Texmag GmbH Vertriebsgesellschaft, Thalwil (CH)

(72) Inventors: Alfred Eder, Biberbach (DE); Jörg Vonderheiden, Bargteheide (DE)

(73) Assignee: Texmag GmbH Vertriebsgesellschaft, Thalwil (CH)

(*) Notice: Subject to any disclaimer, the term of this patent is extended or adjusted under 35 U.S.C. 154(b) by 171 days.

(21) Appl. No.: 16/229,678

(22) Filed: Dec. 21, 2018

(65) Prior Publication Data

US 2019/0193368 A1 Jun. 27, 2019

(30) Foreign Application Priority Data

Dec. 22, 2017 (DE) .......................... 102017223730.9

(51) Int. Cl.
*B31F 1/28* (2006.01)
*B31B 50/16* (2017.01)
(Continued)

(52) U.S. Cl.
CPC ............ *B31F 1/2831* (2013.01); *B31B 50/16* (2017.08); *B31B 50/88* (2017.08); *B41F 33/00* (2013.01);
(Continued)

(58) Field of Classification Search
CPC ........ B31F 1/2831; B41F 33/00; B41F 33/16; B31B 50/16; B31B 50/88; B31B 2120/70;
(Continued)

(56) References Cited

U.S. PATENT DOCUMENTS 4,485,982 A * 12/1984 St. John ................. B65H 23/00
101/484
4,569,584 A 2/1986 St. John et al.
(Continued)

FOREIGN PATENT DOCUMENTS

CN 101578560 A 11/2009
DE 3730097 A1 5/1988
(Continued)

OTHER PUBLICATIONS

European search report with written opinion for application No. 18213939.4; Dated Aug. 27, 2019, 17 pages.
(Continued)

*Primary Examiner* — Sameh Tawfik
(74) *Attorney, Agent, or Firm* — Shumaker, Loop & Kendrick, LLP; S. Alexander Long, Jr.

(57) ABSTRACT

A device for processing a material web (3) that includes means (2) for conveying the material web in a longitudinal direction (L), wherein both an applied, in particular repeated printed image (9) and a control line (10, 11) extending in the longitudinal direction are configured on the material web (3). The control line (10, 11) has a defined position transverse to the material web (3), and the control line (10, 11) is scanned by means of a sensor (15, 16) in a material web (3) processing step. The control line (3) has a digital code structure in its longitudinal direction (L) that encodes a data set of at least four bits, in particular at least two bytes, of information content.

28 Claims, 4 Drawing Sheets

(51) Int. Cl.
- *B31B 50/88* (2017.01)
- *B41F 33/00* (2006.01)
- *B41F 33/16* (2006.01)
- *B65H 35/00* (2006.01)
- *B31B 120/70* (2017.01)
- *G06K 19/06* (2006.01)

(52) U.S. Cl.
CPC ........... *B41F 33/16* (2013.01); *B65H 35/008* (2013.01); *B31B 2120/70* (2017.08); *B65H 2701/1762* (2013.01); *G06K 19/06018* (2013.01)

(58) Field of Classification Search
CPC .......... B65H 35/008; B65H 2701/1762; B65H 2553/42; B65H 2553/45; B65H 2301/122; B65H 35/0066; B65H 35/0093; B65H 35/0204; B65H 26/00; B65H 23/00; B65H 35/04; B65H 2701/1133
USPC .......................................................... 493/22
See application file for complete search history.

(56) References Cited

U.S. PATENT DOCUMENTS

| | | | | |
|---|---|---|---|---|
| 4,808,832 A * | 2/1989 | Doggett | ............... | B65H 23/046 250/237 G |
| 4,839,674 A * | 6/1989 | Hanagata | ................. | B41J 11/46 226/27 |
| 4,965,597 A * | 10/1990 | Ohigashi | ................ | H04N 1/047 347/118 |
| 6,352,497 B1 * | 3/2002 | Hensley | ............ | A61F 13/15707 493/10 |
| 7,297,969 B1 * | 11/2007 | Wolinsky | ............. | D21G 9/0009 250/548 |
| 7,623,699 B2 * | 11/2009 | Floeder | .................... | D06H 1/02 382/100 |
| 8,060,234 B2 * | 11/2011 | Hellstrom | .............. | B65H 26/02 700/128 |
| 9,208,422 B2 * | 12/2015 | Bergholtz | .............. | B65D 85/72 |
| 9,359,118 B2 * | 6/2016 | Nilsson | .................. | B65D 65/38 |
| 10,642,551 B2 * | 5/2020 | Sloan, IV | ............. | G06F 3/1215 |
| 2002/0030704 A1 * | 3/2002 | Korngold | ............... | G03C 11/02 347/1 |
| 2006/0090319 A1 * | 5/2006 | Howe | ................ | G01N 21/8903 29/407.05 |
| 2006/0148631 A1 * | 7/2006 | Protocsnak | ........... | B31F 1/2822 493/463 |
| 2012/0030531 A1 * | 2/2012 | Brewerton | ........... | G11C 29/024 714/719 |
| 2018/0253263 A1 * | 9/2018 | Hower | ....................... | B41J 2/01 |
| 2018/0345619 A1 * | 12/2018 | Lang | ..................... | B65H 35/02 |

FOREIGN PATENT DOCUMENTS

| | | |
|---|---|---|
| DE | 10101860 C1 | 4/2002 |
| DE | 10224372 A1 | 12/2003 |
| EP | 1225535 A2 | 7/2002 |
| JP | S63-7299 A | 1/1988 |
| JP | 1999327116 A | 11/1999 |
| JP | 2002211527 B2 | 7/2002 |
| JP | 2007001183 A | 1/2007 |
| JP | 2009154229 B2 | 7/2009 |
| JP | 2011105450 A | 6/2011 |
| WO | 2017051146 A1 | 3/2017 |
| WO | 2017115291 A1 | 7/2017 |
| WO | WO-2017115291 A1 * | 7/2017 |

OTHER PUBLICATIONS

Opposition for European Patent Application No. 18213939.4, dated Feb. 16, 2022, 10 pages.
ICS IMK-a 7700—Ink-Jet-System for contactless marking Reliable and integrable systems from ICS, Brochure, ICS International AG, 2012, 4 pages.
Office Action for Chinese Application No. 201811572236.7; dated Feb. 7, 2022, 14 pages.
China National Intellectual Property Administration Notification of Second Office Action, Issued Jul. 28, 2022.
Japanese Office Action, issued on Mar. 6, 2023, in corresponding Japanese Patent Application No. 2018-239584.

\* cited by examiner

DEVICE AND METHOD FOR PROCESSING A MATERIAL WEB

TECHNICAL FIELD

The invention related to a device for processing a material web. The invention also relates to a method for processing a material web. The invention also relates to a material web and cardboard packaging produced by means of a material web according to the invention.

BACKGROUND

WO 2017/051146 A1 describes a corrugated cardboard machine in which a printed roll or material web is applied to corrugated cardboard as a surface, wherein the corrugated cardboard is then cut. In addition to the actual printed images, for visual configuration of the cuts, the material web also contains markings with digitally encoded items of information, wherein the items of information can be read during processing and used to control the processing. The markings are configured as two-dimensional field, in particular like a QR code. Irrespective of these markings, a continuous control line is provided on the material web, the position of this line being defined relative to the printed images and the line serving as a positional aid in in the processing of the material web.

The problem underlying the invention is to specify a device for processing a material web in which flexible control and little material waste are made possible.

SUMMARY OF THE INVENTION

This problem is solved in respect of a device referred to in the introduction.

Introducing the digital code structure into the control line itself means that local or temporally resolved items of information on the material web are provided without additional surface area of the material web being taken up for it. At the same time, the control line can retain its function of lateral alignment or lateral position control during processing of the material web.

A control line within the meaning of the invention is any linear structure which functionally serves to ensure guidance and/or lateral positional control during processing or manipulation of the material web. The control line is preferably printed continuously and only interrupted by gaps in the region of the code structure. To save printing ink, however, the control line does not have to be printed continuously. For example, the control line can be printed with regular interruptions or can be missing entirely over a relatively long section. In a possible exemplary embodiment, the control line can, for this purpose, also consist merely of sections with a digital code structure. Such a control line can also serve to ensure lateral positional control or alignment.

A printed image is preferred or, in the narrower sense, a structure or defined surface area consisting of one or more printing-inks serving to provide the design or the visual surface configuration. However, within the meaning of the invention, the printed image also comprises, depending on the circumstances, control marks or other structures such as edges etc. of printing ink which do not or do not merely serve to provide the design.

Within the meaning of the invention, a material web is understood to be a thin web made of paper, plastic film, metal foil, fibrous tissue, multilayered composite material or some other material. The material web is typically, but not necessarily, several meters wide. The material web is usually, but not necessarily, less than 1 mm thick. The length of an uninterrupted material web usually exceeds 100 m and includes typical lengths of several kilometers.

In particular, the invention relates to printed material webs which, in a processing operation, are connected two-dimensionally to cardboard packaging, preferably corrugated cardboard. After the cardboard packaging which has been coated with the material web in this way has been cut, an individually printed package is obtained. Accordingly, the printed images provided on the material web are preferably repeating. The repetition length of such a printed image on the material web is referred to as the repeat length.

According to the invention, the digital code structure is preferably contained in the control line in one-dimensional form so that there is a structural change in the control line only in the longitudinal direction. However, in possible refinements of the invention, the control line may also be structured transversally too. For example, the control line may comprise several parallel, adjacent lines which each have a code structure.

Within the meaning of the invention, a digital code structure may preferably be a two-value or binary item of information. This can be represented, for example, by the statuses "control line present" and "control line not present/interrupted". However, it may also consist of two different print brightnesses or printing inks of the control line to generate a code structure. Alternatively, it is also conceivable for a polyvalent (more than binary) digital item of information to be encoded in the control line using more than two brightness values and/or inks.

In particular, a digital code structure within the meaning of the invention may also comprise a plurality of discrete characters. In a generally advantageous manner, this may be a human-readable item of information in plain text. For example, the plain text or human-readable item of information may comprise the letters of an alphabet, preferably of the Latin alphabet, and/or the Arabic numbers 0-9.

It must essentially be understood that such human-readable plain text can also be read mechanically with corresponding sensors and programs (OCR=Optical Character Recognition). It must also essentially be understood that people could in principle also read binary encoded items of information, but this is not usually practicable. "Human-readable plain text" is therefore to be understood in the present sense as any encoding which is optimized for rapid and effective absorption by a person, such as conventional human writing systems.

In general, a digital code structure within the meaning of the invention may include several types of digital encoding at the same time. In particular, these may be binary encoded items of information and items of information encoded in plain text.

The minimum information content of four bits, that is to say 16 statuses, is only sufficient for simple control tasks. At least one byte is preferably encoded in the data set, and at least two bytes, that is to say 65536 statuses, are even more preferable. At least four bytes are even more advantageously encoded in the data set, and at least 6 bytes(=48 bits) are particularly advantageous.

In a preferred embodiment of the invention, the control line is applied to the material web by applying ink by means of a printing mechanism. The application preferably takes place here in the same processing step as an application of the printed image. This allows simple provision of the control line overall. A fixed relative positioning of the control line with respect to the printed image consisting, in particular, of ink is preferably made possible here.

Depending on requirements, the control line may can be applied by means of the same printing mechanism as the printed image in order to reduce the number of components. As an alternative to this, the control line can also be applied by means of an individual or separate printing mechanism in order to preserve a printing mechanism applying the printed images.

In a generally advantageous manner, provision may be made for at least a second control line running in the longitudinal direction to be arranged in another region of the material web. In this way, any transverse shift of the material web during processing can be detected. In particular, the second control line can also have a digital code structure in the same way as the first control line.

In a preferable refinement, the two control lines are assigned to different print orders on the same material web here. For example, a plurality of different print orders may be provided for alongside one another on the same material web. The print orders may, in particular, have different printed images with different repeat lengths. Operation with a plurality of print orders alongside one another is also referred to as dual-lane or multi-lane operation.

In a particularly preferred refinement of the invention, the control line is arranged here in a first edge region of the material web, wherein the second control line is arranged in a transversally opposite second edge region of the material web. This enables the spacing of the control lines and therefore of the edges of the material web to be controlled by means of the corresponding use of sensors. This means, for example, that cutting blade positions or the like can also be optimally corrected in dual-lane or multi-lane operation.

In a generally advantageous manner, provision is made for the code structure to comprise gaps in the control line, wherein a length of each of the gaps does not exceed a maximum value. In order to ensure reliable functioning of the control line for the purposes of aligning the apparatus, the maximum size of a gap in relation to a resolution of the scanning by the sensor is prescribed. A typical maximum size of a gap may, for example, be 9 mm. A smallest unit of length which is reliably detected by the sense here may, for example, be 3 mm, this being defined as a block or the minimum length of a feature. The maximum length of a gap in a code structure according to the invention is therefore three blocks.

Code segments of the control line are preferably defined by the gaps, wherein at least two, in particular at least four different discrete lengths of the code segments are provided, these corresponding to a digital item of information of at least two, in particular at least four different values per code segment. In this way, a proportion of gaps or unprinted regions of the control line is kept particularly low so that the guiding function of the control line is assured irrespective of the data content of the code structure. For example, the code segments may be 2 blocks, 3 blocks, 4 blocks or 5 blocks in length which, for example, are assigned the decimal numbers 1 to 4 or the binary numbers 00, 01, 10 and 11. Depending on the resolution of the sensor, other systems for translating code segments of different lengths into digital values may also be defined.

Provision is particularly preferably made here for the data set to comprise a large number of gaps and code segments following one another, wherein, in particular, the data set is of a length in the longitudinal direction which depends on the encoded information, wherein the length does not exceed a defined maximum length. Therefore, for example, each printed image may be assigned its own data set which, in particular, is encoded in the same position relative to the printed image in the control line. In order to ensure such assignment, the theoretical maximum length of the data set merely has to be smaller than the repeat length of the printed image.

In a particularly advantageous embodiment of the invention, the device comprises a corrugated cardboard machine, wherein control information for the corrugated cardboard machine is preferably contained in the data sets of the material web. Possible information in the data sets is, for example, the material web's roll ID, the order number of the print order, consecutive numbering of the printed images, a meter counter for the length of the material web, the order quantity, the repeat length or the like. Since the control line is preferably applied at the same time or immediately after the printed images, real-time data on defects and rejects can, in particular, also be encoded. For example, such items of information are helpful if problems with the order for the printed images have arisen in individual sections of the material web.

Through the control line according to the invention, defects in the material web can be sorted out in a corrugated cardboard machine just like when using a digital roll protocol. If required, a digital roll protocol can be used in addition to a code structure of the control line according to the invention.

In a generally advantageous manner, the material web may be configured as a digitally preprinted roll of a digital printing machine. Modern digital printing machines, for example Hewlett Packard's HP T1100S model, can apply particularly flexible print orders to a material web. Such machines generate, in particular, digital roll protocols on the material web generated. There may be a number of different print orders both in the transverse direction and in the longitudinal direction. Provision is particularly preferably made here for the material web to have at least two different printed images arranged alongside one another and repeated in the longitudinal direction, wherein, in particular, the printed images have repeat lengths which differ in the longitudinal direction.

In principle, the high level of flexibility even allows printed images which are not repeated but are completely different and have different repeat lengths to be applied in the longitudinal direction. Encoding by means of the control line according to the invention enables each of the printed images to be assigned to a respective data set.

In a generally advantageous manner, the combination of the material web with the data sets in the control line according to the invention enables at least essential data which are contained, for example, in a roll protocol of a digital printing machine to be printed on the material web. The invention also enables existing corrugated cardboard machines to be upgraded easily. For example, the preprints or material webs can be produced externally here. The processing into pieces of corrugated cardboard or packaging then takes place with the aid of the control line data which has been read. To achieve this, the sensor(s) of an existing apparatus merely have to be correspondingly adapted and coupled to a process control system.

In an advantageous embodiment of the invention, a breadth of the control line is less than 4 mm, wherein a clearance with a breadth of less than 4 mm to each side of the control line is provided. The breadth of the control line is particularly preferably about 3 mm with lateral clearances of 3 mm in each case too. Such dimensioning saves offcuts overall and optimizes the useful surface of the material web.

In order to produce such narrow control lines, an optimal resolution of the sensors is expediently no more than 0.25 mm, in particular both in the longitudinal direction and in the transverse direction.

In a further advantageous manner, cut marks are printed laterally alongside the control line, wherein the cut marks can be read as a control signal for a cutting mechanism. This is an analog signal with a position which is correlated as accurately as possible to the printed image. Cut marks protruding laterally alongside the control line increase process reliability and cutting accuracy. As an alternative to the above, the code structure of the control line could also serve as a cut mark itself. The cut marks are advantageously read with the same sensor as the code structure of the control line.

The data set preferably contains one or more items of information selected from the group consisting of consecutive numbering of the printed image, identification of a print order, information on an order change or information on defects.

In a generally preferred embodiment of the invention, the sensor records a two-dimensional digital image of the control line, wherein the image is electronically evaluated. This may, for example, be carried out by means of a conventional CCD camera which takes a quasi-infinite 2D image at least of the relevant region of the material web passing through as a line scan camera. These digital images can then be evaluated both in terms of the position or control/monitoring function of the control line and in respect of the digital information of the code structure.

In a generally advantageous manner, the code structure is configured to be bidirectionally readable. This allows it to be read, in particular, even if the material web is unrolled in one or other direction in any intermediate steps. Such bidirectional readability can ideally be combined with the recording of a two-dimensional image of the control line.

In a further preferable embodiment of the invention, in addition to the digital code structure, a human-readable item of information in plain text is applied to the material web. The human-readable item of information is preferably, but not necessarily, correlated with the information content of the code structure. For example, at least part of the information of a binary digital code structure may be repeatedly applied in plain text. Even in highly automated production processes, it may, in certain situations, be necessary to intervene or monitor manually. It is advantageous for the intervening party if an integrated item of information can be ascertained simply by reading it.

In a generally preferable manner, the human-readable item of information is applied in plain text in the same operation as the rest of the control line. In particular, the plain text can be applied to the material web by applying ink by means of a printing mechanism.

In a particularly preferable detail, the plain text is positioned congruent with the control line here. For example, a continuous part of the control line or a part without binary or other encoding may be used to provide the plain text in a space-saving manner. Particularly in the case of control lines with large breadths of several millimeters, for example 5 mm, particularly good readability by a person is provided at the same time. Breadths of the control line in combination with human-readable plain text which are preferred according to the invention range from 3 mm to 8 mm, particularly preferably 4 mm to 6 mm.

In an alternative to the above or in a supplementary embodiment, the plain text may be positioned outside the control line. This may preferably also be inside the printed image.

In an alternative embodiment of the invention, the digital code structure comprises a human-readable item of information in plain text, wherein the digital item of information preferably consists exclusively of the plain text, Such a code structure allows a space-saving arrangement along with human readability. Machine readability can also be provided for through suitable sensors and programs (OCR systems).

In a generally advantageous manner, the plain text comprises alphanumeric characters, preferably Latin letters and/or Arabic numbers. If the plain text, for example, consists of alphanumeric Latin letters and Arabic numbers, there are at least 36 different characters. A single character therefore already encodes an information content of more than five bits. With four of these characters (36*36*36*36=1679616 combinations), an information content of more than two bytes can be encoded.

The problem underlying the invention is also solved by a material web, preferably for processing with a device according to the invention, wherein both an applied, in particular repeated printed image and a control line extending in the longitudinal direction are configured on the material web, and wherein the control line has a defined position transverse to the material web, and wherein the control line has a digital code structure in its longitudinal direction, wherein the code structure encodes a data set of at least four bits, in particular at least two bytes, of information content.

A material web according to the invention advantageously serves, in particular, as a printed surface for the production of cardboard packaging or corrugated cardboard.

The problem underlying the invention is also solved by cardboard packaging, preferably corrugated cardboard, produced by applying a material web according to the invention to a support and cutting the support in conjunction with detecting the control line.

The problem underlying the invention is also solved in respect of a method for processing a material web with the characterizing features mentioned in the introduction.

The method according to the invention is preferably carried out by means of a device as disclosed and claimed.

Further advantages and features of the invention can be seen from the exemplary embodiments described below and from the dependent claims.

Four preferable exemplary embodiments of the invention are described below and explained in more detail by reference to the drawings.

DETAILED DESCRIPTION

Figure 1:
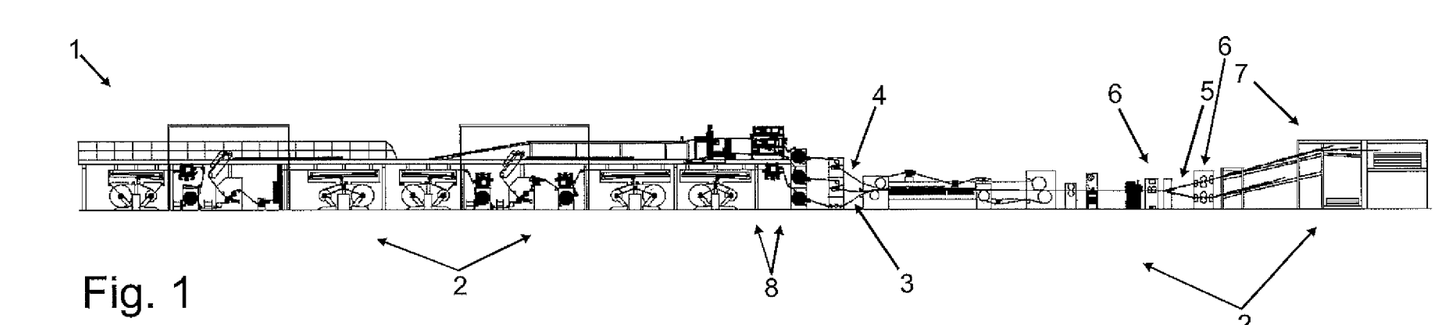
FIG. 1 shows a schematic view of a device according to the invention from the side.

The device shown in FIG. 1 is corrugated cardboard machine (CCM) 1 which has a plurality of stations 2 for feeding, conveying and processing material. An upper printed material web 3 is applied two-dimensionally onto other webs 4 as a support here and are thereby joined together to form a printed corrugated cardboard 5.

After being joined together, the web consisting of printed corrugated cardboard 5 is cut into individual cardboard packaging or pieces of corrugated cardboard or packaging in a cutting station 6, the latter being stacked in a deposit station 7.

In a procedure which is preferred here, the printed material web 3 is produced on an external printing machine (not shown). Already preprinted rolls are therefore supplied to the CCM and fixed.

Alternatively, the printing of the material web 3 can also be carried out directly during the production of the corrugated cardboard by means, in particular, of a digital printing machine 8. No such integrated printing machine is shown in detail, but one would be arranged in the region of reference numeral 8 in an apparatus according to FIG. 1.

Irrespective of how the material web 3 is produced, printed images 9 are applied to the latter. The printed images 9 are repeated at a repeat length RL in a longitudinal direction L of the material web 3.

Figure 2:
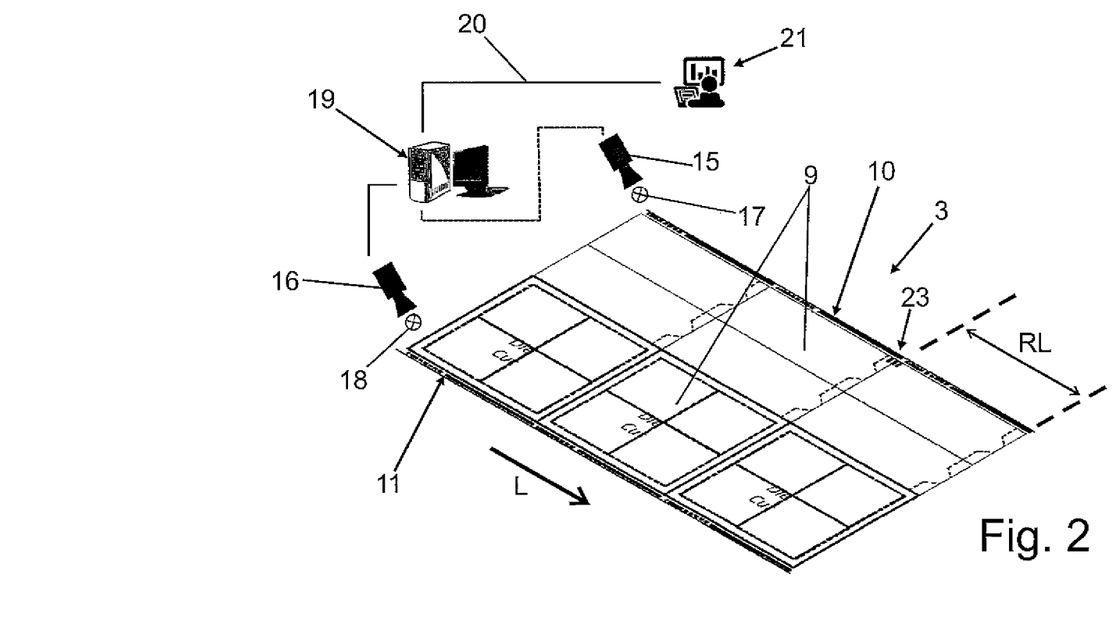
FIG. 2 shows a schematic three-dimensional view of a material web according to the invention with sensors arranged thereabove.

A control line 10, 11 is configured on each side of the material web. The control lines 10, 11 are applied to the material web 3 by the printing machine 8 by means of printing ink. The control lines 10, 11 are each located in an edge region of the material web 3, wherein the edge regions are transversely opposite.

Each of the control lines 10, 11 has a breadth B of 3 mm. A free unprinted region at least 3 mm in breadth is provided on at least one side of each of the control lines. Each of the control lines 10, 11 therefore requires a strip which is 6 mm in breadth at the edge of the material web 3.

The control lines 10, 11 each have code structures 12 which are configured as a whole by gaps 13 or unprinted regions and code segments 14 extending between the gaps 13.

The control lines 10, 11 are each visually perceived here by a separate sensor 15, 16. For this purpose, alongside sensors 15, 16, a defined light 17, 18 of the control lines 10, 11 is provided above the material web 3. The sensors 15, 16 are connected to a control computer 19 which evaluates the signals from the sensors. The control computer 19, for its part, is connected to a process control system 21 of the CCM via an interface 20.

In the present case, the sensors 15, 16 are in each case configured as a CCD camera in the form of a line scan camera. The line scan camera, when triggered by a speed signal, scans line by line. This produces an "endless 2D image" of the control lines 10, 11. The images are electronically evaluated by the control computer 19. Algorithms extract the data contained therein in coherent code sequences and evaluate their contents.

The code structure is configured to be bidirectionally readable here so that the item of information is recognized irrespective of the direction in which the image is taken and/or in which the material web 3 is passing through.

The processing of the material web to produce fully cut cardboard packaging or pieces of corrugated cardboard can be controlled and monitored by following the control lines 10, 11 and reading the code structures 12.

The sensors (scanners) used hitherto in the prior art are improved upon in the solution here by a factor of 4 and the scanning speed is also more than doubled. The demands on the printed control line therefore need to be reassessed. If the resolution of the line breadth by the sensor was approx. 1 mm in the prior art, resolution is 0.25 mm according to the invention.

Alongside the code structures 12, the control lines 10, 11 consist of continuous or uniformly printed sections which are in principle of any desired or quasi-infinite length. These sections serve solely to ensure lateral positional control of the material web in the manner of an analog control signal. By arranging the two control lines on the opposite edges of the material web, in particular, a change in the breadth of the material web can be accurately controlled. Such changes in breadth through external influences constitute a possible source of errors in the production of corrugated cardboard.

The makeup of the code structures 12 is as follows here:

The gaps 13 in the control lines extend over the entire breadth of the control line 10, 11. They are a minimum length of 3 mm in the longitudinal direction L. The minimum length of a feature, be it a gap or a printed section, is 3 mm here and is referred to as a block. Depending on the resolution of the sensors 15, 16, a breadth of the control line or a length of a block may also assume other values.

The end of a quasi-infinite section of the control line 10, 11 is in each case introduced by a gap 13 which is three blocks in length. For redundancy reasons, there follows in each case a printed index mark 22 which is one block in length. The index mark 22 serves as a start code and also prescribes the reading direction.

Figure 4:
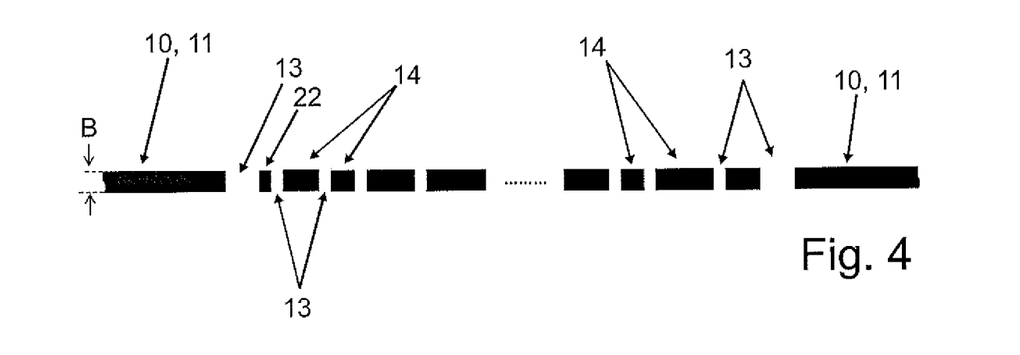
FIG. 4 shows a representation of a section of a control line of a material web according to the invention with a code structure.

The control computer 19 has been reliably informed hereby that there now follows a sequence which is provided with data content (see also the representation in FIG. 4).

The sequence or the entire data set consists of a succession of code segments 14. The number of code segments 14 per data set is stipulated here and is 24 pieces. Each of the code segments 14 is separated from the following code segment 14 by a gap 13 which is 3 mm in length or a block.

A code segment 14 is configured is a continuously printed section which is of one of four possible lengths: two blocks, three blocks, four blocks or five blocks. These different code segments 14 may, for example, be assigned to the binary numbers 00, 01, 10 and 11 so that a code segment 14 has an information content of 2 bits. Since a data set comprises 24 code segments 14 in this case, it contains an item of information of 48 bits or 6 bytes.

The end of the data set is in turn indicated by a gap 13 which is three blocks in length. In the present case, the term gap 13 is used both for the start and end signals of the code structures 12 which are three blocks long and for the spaces between the code segments 14 which are just 1 block long. In principle, however, these types of gaps are different types of segment of the code structure. The respective length of the region has a corresponding significance both in the printed and in the free regions of the code structure.

There are therefore a total of seven different types of segment in the code structure, these being summarized again in the table below:

| Name | Description | Value | Length | Length [mm] | Module |
|---|---|---|---|---|---|
| Index | Start signal, printed | | 1 block | 3 | ■ |
| Code seg. 0 | Data value | 00 | 2 blocks | 6 | ■ |
| Code seg. 1 | Data value | 01 | 3 blocks | 9 | ■ |
| Code seg. 2 | Data value | 10 | 4 blocks | 12 | ■ |
| Code seg. 3 | Data value | 11 | 5 blocks | 15 | ■ |
| Gap | Unprinted length between code segments | | 1 block | 3 | ▪ ■ |
| Start gap | Unprinted gap to beginning and end of the data set | | 3 blocks | 9 | ▪ ■ |

The absolute length of a data set depends on the information content to be displayed (237 mm-453 mm). The makeup of the code enables bidirectional decoding (reading forward and backward).

A data set of the control line 10 is illustrated in abbreviated form by way of example in FIG. 4. From left to right in the drawing, there is first a gap 13 which is three blocks in breadth followed by the index mark 22 which is one block in breadth. Then come the first four code segments 14 of different length, that is to say the information bits 0 to 7.

Because of the abbreviated illustration, the last four code segments, that is to say the information bits 40 to 47, are shown again hereafter. There then follows the end gap 13 which is 9 mm or 3 blocks in length. After that comes another quasi-infinite section of the control line 10.

To control a cross cutter or cutting mechanism of the CCM, special cut marks 23 are also already printed during the printing process. These cut marks 23 are read immediately before a knife shaft on the CCM with corresponding sensor technology.

Figure 3:
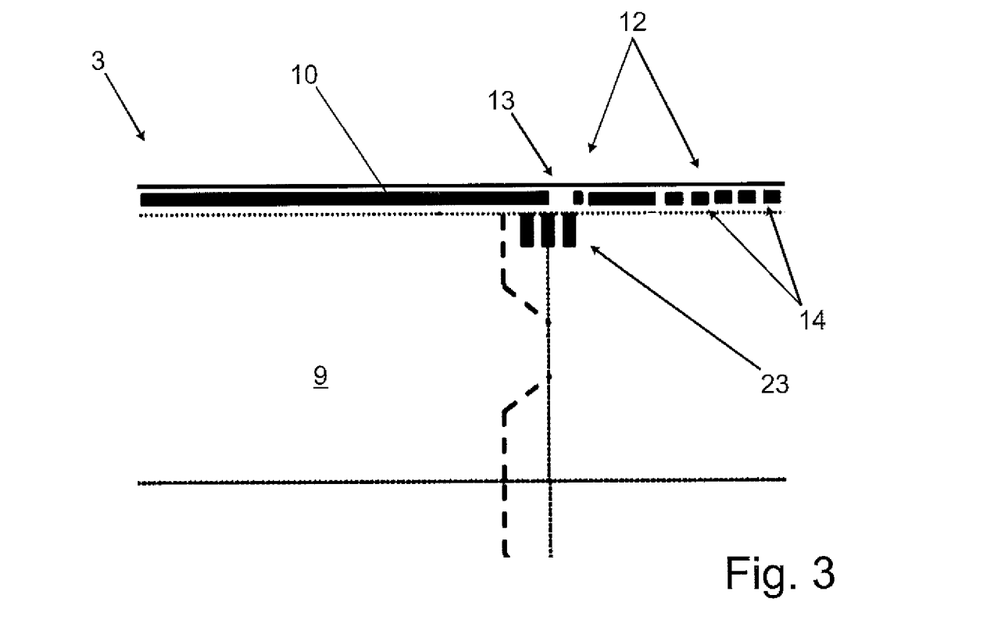
FIG. 3 shows a plan view of an enlarged detail of the material web from FIG. 2.

The cut mark 23 may be integrated in the control line or printed on the inside of the control line 10, 11, see FIG. 3. The control line 10, 11 with the code structure is removed when the edge is trimmed whilst the cut mark 23 remains and can control the cutting knife transversely to the web.

The individual data sets of the code structure and the cut marks 23 are usually always printed per repeat. Through integration into the control line 10, the cut marks 23 can also be perceived by the same sensors (scanners) 15, 16 on the CCM. This results in redundant evaluation.

Figure 5:
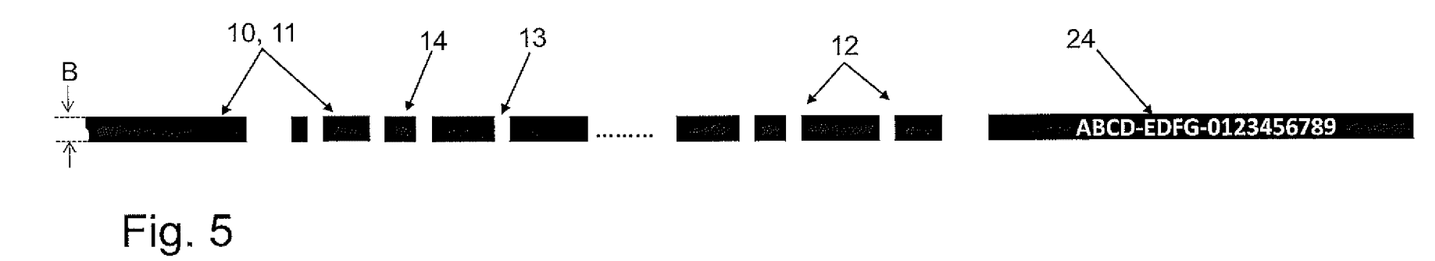
FIG. 5 shows a second exemplary embodiment of the invention in which a control line contains additional information in human-readable plain text.

In the second exemplary embodiment of the invention shown in FIG. 5, in addition to the digital code structure 12, a human-readable item of information in plain text 24 is applied to the material web 3. The human-readable item of information 24 is correlated with the information content of the code structure. At least some of the information in the binary digital code structure 12 is repeatedly applied to the material web 3 in plain text 24.

The plain text 24 comprises alphanumeric characters, in the present case Latin letters and Arabic numbers.

The second exemplary embodiment differs from the first exemplary embodiment only by the additional plain text 24 and a somewhat larger breadth of the control line, so reference is made to the first example with respect to the further characteristics, in particular the binary code structure 12.

Even in highly automated production processes, it may, in certain situations, be necessary to intervene or control manually. It is advantageous for the intervening party if an integrated item of information can be ascertained simply by reading it.

In the exemplary embodiment according to FIG. 5, the plain text 24 is positioned here congruent with the control line 10, 11. The quasi-infinite section of the control line 10, 11 described in the first exemplary embodiment is used here as a continuous part of the control line 10, 11 without binary or any other encoding in order to provide for the plain text 24 in a space-saving manner. The plain text 24 is configured in the present case as reverse print, that is to say as an omission inside the control line printed over the full surface. There therefore remain sufficient continuous edges of the control line in order to rule out any misinterpretation of the plain text 24 as a binary code structure 12.

Particularly in the case of control lines 10, 11 with large breadths B of several millimeters, 5 mm in the present example, particularly good human readability is provided at the same time. Breadths of the control line 10, 11 in combination with human-readable plain text 24 which are preferred according to the invention range from 3 mm to 8 mm, particularly preferably 4 mm to 6 mm.

The human-readable information in plain text 24 is applied in the same operation as the rest of the control line 10, 11. The plain text is also applied to the material web 3 by applying ink by means of a printing mechanism, in the present case by the printing machine 8.

Figure 6:
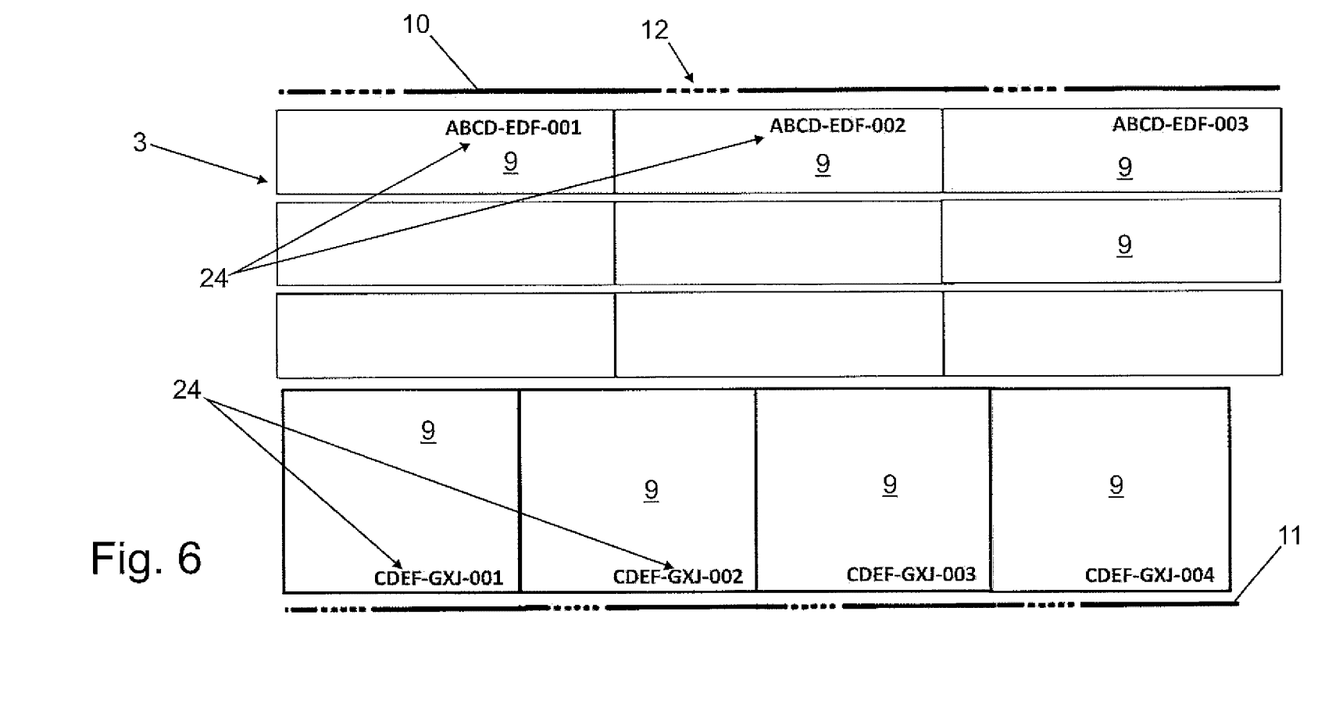
FIG. 6 shows a third exemplary embodiment of the invention in which additional information in human-readable plain text is provided outside a control line.

In a third exemplary embodiment of the invention according to FIG. 6, unlike in the second exemplary embodiment, the plain text 24 is positioned outside the control line 10, 11. In the present case, the plain text is in each case in one of the printed images 9.

Figure 7:
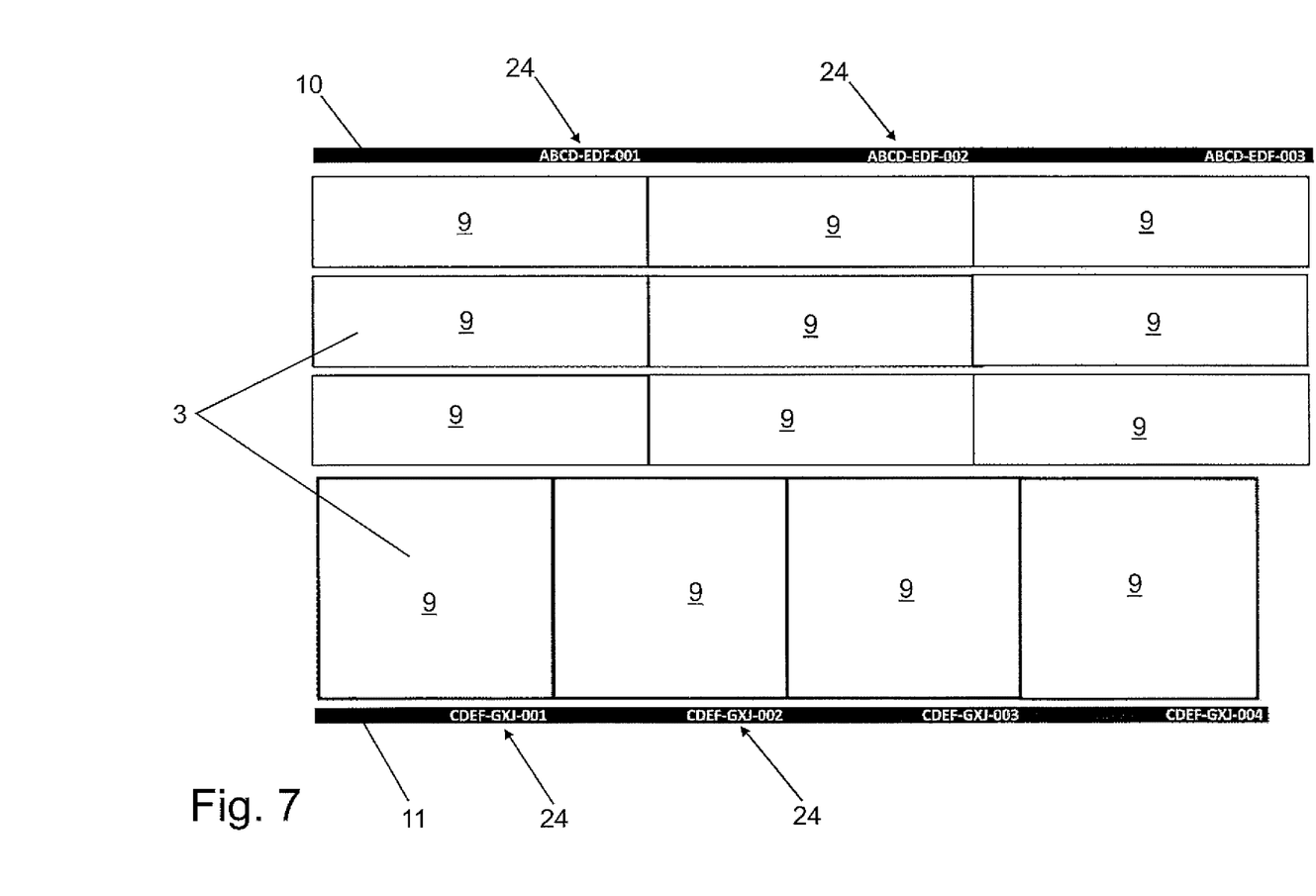
FIG. 7 shows a fourth exemplary embodiment of the invention in which a control line exclusively contains information in human-readable plain text.

In a fourth exemplary embodiment of the invention according to FIG. 7, the digital code structure within the meaning of the invention comprises a human-readable item of information in plain text 24, wherein the digital item of information consists exclusively of the plain text 24. Such a code structure 24 allows a space-saving arrangement along with the human readability. Machine readability can also be provided for through suitable sensors 15, 16 and programs (OCR systems).

The fourth exemplary embodiment according to FIG. 7 corresponds, including with respect to the breadth of the control lines 10, 11, to the second exemplary embodiment according to FIG. 5, but the binary code structure 12 is not present. The plain text 24 is positioned congruently on one of the control lines 10, 11 in each case.

In other words, the example according to FIG. 7 relates to conventional continuous control lines 10, 11 on which a digital code structure in the form of the human-readable plain text 24 is stored.

Since the present case relates to alphanumeric Latin letters and Arabic numbers, there are at least 36 different characters. A single character therefore already encodes an information content of more than five bits. With four of these characters (36*36*36*36=1679616 combinations), an information content of more than two bytes can be encoded.

LIST OF REFERENCE NUMERALS

1 Corrugated cardboard machine (CCM)
2 Stations of the CCM
3 Material web
4 Further webs, support for the material web
5 Printed corrugated cardboard
6 Cutting station, CCM cutting mechanism
7 CCM deposit station
8 CCM printing machine
9 Printed images
10 First control line 11 Second control line
12 Code structure
13 Gap
14 Code segment
15 First sensor
16 Second sensor
17 First light
18 Second light
19 Control computer
20 Interface
21 Process master computer
22 Index mark
23 Cut mark
24 Human-readable plain text, alphanumeric characters
RL Repeat length
L Longitudinal direction of the material web
B Breadth of the control line

We claim:

1. A device for processing a material web, comprising:
conveying means for conveying the material web in a longitudinal direction, wherein the material web includes at least one applied printed image; and
a first control line applied to the material web, the first control line extending in the longitudinal direction of the material web, wherein the first control line comprises a linear structure and a digital code structure in the longitudinal direction, wherein the digital code structure comprises a data set, including a plurality of code segments having at least four bits of information content associated with the at least one printed image, and wherein one or more sections of the first control line is scanned by a sensor in a material web processing step to provide a lateral positional control of the material web relative to the conveying means during processing or manipulation of the material web.

2. The device according to claim 1, wherein the first control line is applied to the material web by applying ink by means of a printing mechanism and the application takes place in the same processing step as an application of the at least one printed image.

3. The device according to claim 1, wherein at least a second control line running in the longitudinal direction is arranged in another region of the material web.

4. The device according to claim 3, wherein the first and second control lines are assigned to different print orders on the same material web.

5. The device according to claim 3, characterized in that the first control line is arranged in a first edge region of the material web and the second control line is arranged in a transversally opposite second edge region of the material web.

6. The device according to claim 1, wherein the digital code structure of the first control line further comprises a plurality of gaps, wherein each of the code segments of the data set is separated from another one of the code segments of the data set by one of the gaps having a first length, and wherein the data set of the digital code structure is at least one of preceded and succeeded by a respective one of the gaps having a second length greater than the first length.

7. The device according to claim 6, wherein the first length of the gaps does not exceed a maximum first value, the second length of the gaps does not exceed a maximum second value, and each of the code segments of the data set has an information content of two bits.

8. The device according to claim 6, wherein the data set comprises the gaps and the code segments following one another and the data set is of a length in the longitudinal direction which depends on the information content associated with the at least one printed image, and wherein the length of the data set does not exceed a defined maximum length.

9. The device according to claim 6, wherein the first control line extends continuously on the material web in the longitudinal direction and is interrupted by the gaps of the digital code structure.

10. The device according to claim 1, wherein the device comprises a corrugated cardboard machine, and the control information for the corrugated cardboard machine is contained in the data sets of the digital code structure.

11. The device according to claim 1, wherein the material web is a digitally preprinted roll of a digital printing machine.

12. The device according to claim 1, wherein the material web has at least two different printed images arranged alongside one another in the longitudinal direction, and the printed images have repeat lengths which differ in the longitudinal direction.

13. The device according to claim 1, wherein a breadth of the first control line is less than 4 mm, and wherein a clearance with a breadth of less than 4 mm to at least one side of the first control line is provided.

14. The device according to claim 1, wherein cut marks are printed laterally alongside the first control line and the cut marks can be read as a control signal for a cutting mechanism.

15. The device according to claim 1, wherein the data set contains one or more items of information selected from the group consisting of consecutive numbering of the at least one printed image, identification of a print order, information on an order change and information on defects.

16. The device according to claim 1, wherein the sensor records a two-dimensional digital image of the first control line and the image is electronically evaluated.

17. The device according to claim 1, wherein the digital code structure is bidirectionally readable.

18. The device according to claim 1, wherein in addition to the digital code structure, a human-readable item of information in plain text is applied to the material web, wherein, the human-readable item of information is correlated with the information content of the digital code structure.

19. The device according to claim 18, wherein the plain text is positioned congruent with the first control line.

20. The device according to claim 18, wherein the plain text is positioned outside the first control line and inside the at least one printed image.

21. The device according to claim 18, wherein the digital code structure comprises a human-readable item of information in plain text and the digital item of information comprises exclusively the plain text.

22. The device according to claim 18, characterized in that the plain text consists of alphanumeric characters selected from the group consisting of Latin letters and Arabic numbers.

23. A material web for processing with the device according to claim 1, wherein both the at least one applied printed image and the first control line extending in the longitudinal direction are applied on the material web.

24. The device according to claim 1, wherein the one or more sections of the first control line comprises at least one of the data set including the plurality of code segments of the digital code structure and a quasi-infinite printed section of the linear structure.

25. The device according to claim 24, wherein one of the code segments is bounded in a direction transverse to the longitudinal direction by one of the sections of the digital code structure.

26. The device according to claim 24, wherein the quasi-infinite printed section of the linear structure is substantially aligned with the one or more sections of the digital code structure.

27. The device according to claim 1, wherein the one or more sections of the first control line comprises the data set including the plurality of code segments of the digital code structure and a quasi-infinite printed section of the linear structure.

28. The device according to claim 1, wherein one or more of the linear structures and one or more of the digital code structures are arranged in alternating succession.

\* \* \* \* \*